Sept. 9, 1924.  
E. E. ELLIS  
TOOL HOLDER  
Filed Dec. 21, 1921  
1,507,992

Inventor:  
Emory E. Ellis.  
By Attorney  
Owen W. Kennedy

Patented Sept. 9, 1924.

1,507,992

UNITED STATES PATENT OFFICE.

EMORY E. ELLIS, OF ORANGE, MASSACHUSETTS.

TOOL HOLDER.

Application filed December 21, 1921. Serial No. 523,952.

*To all whom it may concern:*

Be it known that I, EMORY E. ELLIS, a citizen of the United States, residing at Orange, county of Franklin, Commonwealth of Massachusetts, have invented certain new and useful Improvements in a Tool Holder, of which the following, together with the accompanying drawings, is a specification.

My invention relates to tool holders for use on lathes, planers, shapers, and other similar machines, and it relates particularly to a holder for a turning tool.

In United States Patent No. 1,220,324, issued to me on March 27, 1917, there is shown and described a tool holder which is adapted to rigidly lock a cutter or other tool in any one of its three customary positions of use, namely, straight, right or left, the head of the holder being so constructed as to provide stop shoulders on each side of the cutter in any one of its positions, so that all tendency for the tool to turn when making a heavy cut, is eliminated. A clamping device is adapted to coact with the head of the holder, shown in the above mentioned patent, by means of which the tool may be clamped in any one of its three customary positions, but the tool is always adapted to extend from the holder at the same angle, owing to the fact that the tool seats, being formed in the head of the holder, are incapable of angular adjustment.

The object of the present invention is to provide an improved tool holder which is not only adapted to rigidly lock the cutter or tool in any one of its three customary positions, as in the above mentioned patent, but is also adapted to clamp the tool at different angles with respect to the work, this being accomplished by means of an adjustable seat coacting with the head of the holder, and an improved clamping device. The advantageous features of my invention will hereinafter more fully appear in the specification, reference being had to the accompanying drawings in which, Fig. 1 is a view, partially in transverse section and partially in side elevation of a tool holder constructed in accordance with my invention.

Like reference characters refer to like parts in the different figures.

Figure 1:
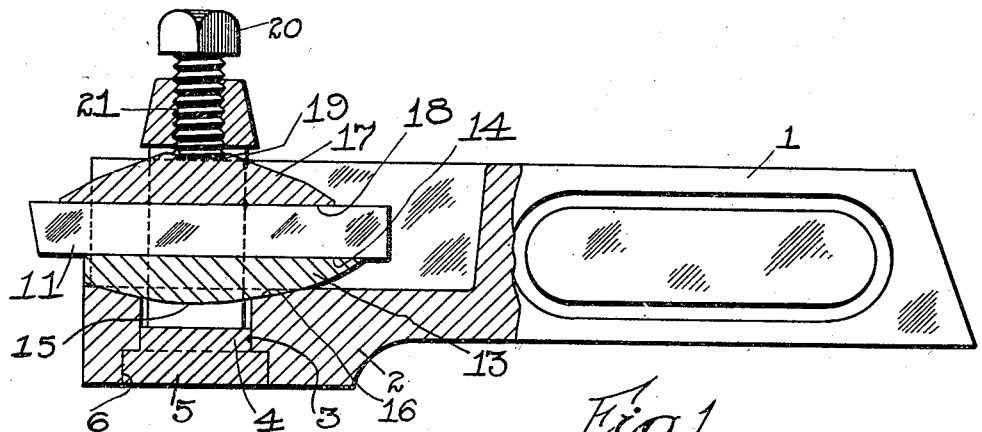

Referring to the drawings, the holder generally comprises a shank 1 having an enlarged circular head 2 through which extends an opening 3, substantially at right angles to the longitudinal axis of the shank 1. A tool post 4 is received in the opening 3 and is provided with an enlarged portion 5 which is adapted to be seated in a countersunk portion 6 of the opening 3.

Figure 2:
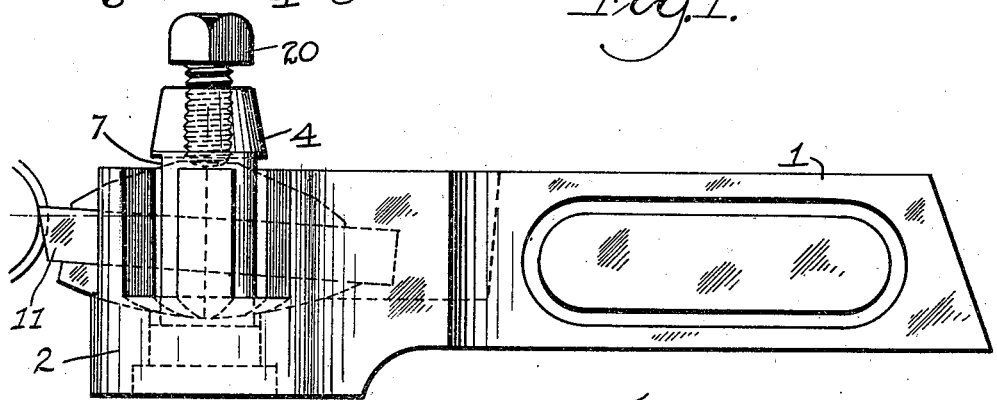
Fig. 2 is a view in side elevation, of my improved tool holder, showing the tool or cutter clamped in position at a different angle from the tool shown in Fig. 1.
Figure 3:
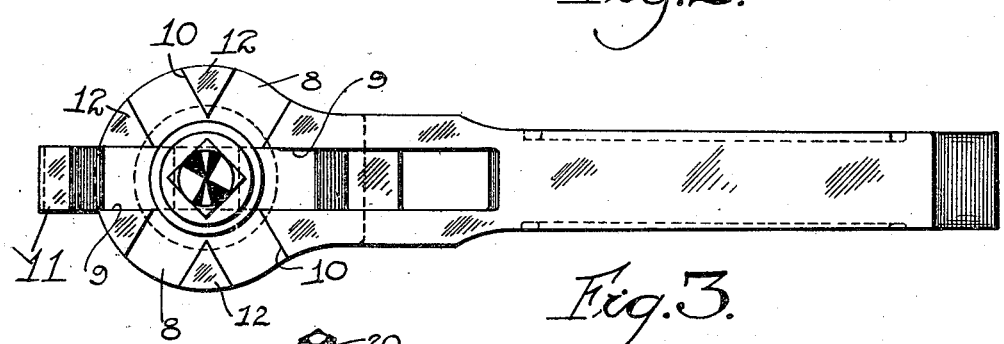
Fig. 3 is a plan view of the parts shown in Fig. 1.
Figure 4:
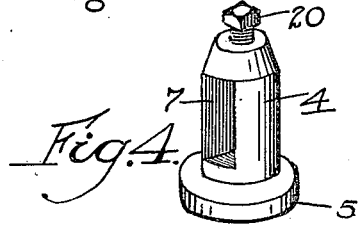
Fig. 4 is a perspective view of the tool post shown in Fig. 1.

As best shown in Figs. 2 and 4, the post 4 is provided with a slot 7 extending diametrically therethrough, and which is adapted to register with any one of a plurality of pairs of alined, diametrically opposed notches 8, 8, 9, 9, and 10, 10, formed in the head 2 and radiating from the central opening 3. When the tool post 4 is so positioned in the opening 3, as to be in alinement with any given pair of notches, such for example, as the notches 9, as shown in Fig. 3, there is provided a continuous socket for receiving a cutting tool 11, which extends through the notches 9 and the slot 7 and is locked against turning movement in the holder by its engagement with the segmental portions 12 of the head remaining between adjacent notches. In order to position the tool 11 at the desired cutting angle, in any one of the sockets provided by registration of the slot 7 with any given pair of notches 8, 9 or 10, I have provided an improved tool positioning and clamping device which will now be described.

Referring again to Fig. 1, the tool 11 is supported in its socket by means of a block 13, providing a plane surface 14 on which the tool 11 rests, and a curved surface 15, having the same radius of curvature as the seats 16 provided at the bottom of each of the notches 8, 9 and 10. The tool 11 is adapted to be held in close contact with the plane surface 14 of the block 13 by means of a clamping block 17 provided on one side, with a plane surface 18 engaging the tool 11, and provided on the opposite side thereto, with a depression 19 for receiving the lower end of a set screw 20 in threaded engagement with an opening 21, extending through the tool post 4 above the slot 7.

When it is desired to clamp the tool 11 in position for a cut, the slot 7 in the tool post 4, is caused to register with the desired pair of notches 8, 9 or 10, after which the block 13, the tool 11 and the clamping block 17, are inserted in the socket, thus provided. The lower block 13 is then positioned on the seats 16 until the cutting end of the tool 11 is at the desired angle to the work, after which the set screw 20 is turned down into the tool post 4 to clamp the tool 11 tightly between the blocks 13 and 17. It is obvious that turning down the screw 20 will also cause the lower curved surface 15 of the block 13 to be held in close engagement with the seats 16. Should it be desired to change the angle of the tool 11, it is only necessary to loosen the set screw 20 and shift the block 13 on the seats 16 until the tool has the desired angle, after which the set screw is again tightened. The tool 11 is clearly shown at different angles in Figs. 1 and 2.

From the foregoing it is apparent that I have provided an improved tool holder that is adapted to not only rigidly lock the tool in any one of its three customary positions, as described in my above mentioned patent, but is also adapted to clamp the tool at any desired angle with respect to the work. By the use of my improved tool holder it is possible for the operator to lock the tool in either its straight, right or left position at different angles to give the desired amount of clearance for the chip when the tool is cutting, thereby greatly increasing the effectiveness of the tool holder from an operating standpoint. It is obvious that when the tool has once been clamped in any one of its customary positions at the desired angle, it will be practically impossible for the tool to turn in the holder when making a heavy cut, owing to the fact that the blocks between which the tool is clamped, are rigidly held against angular movement by the sides of the slot in which they are received. The possibility of the tool changing its angle while cutting is also very remote, owing to the fact that the set screw 20 exerts pressure on the blocks 17 and 13 at a point between the curved seats 16, so that the pressure is divided and a maximum amount of frictional resistance to the sliding of the block on the seats is obtained.

While I have shown my invention as embodied in a particular arrangement of the parts of a tool holder, it is not so limited but is susceptible of various modifications within the scope of the appended claims.

I claim.

1. A tool holder comprising a head provided with a pair of alined curved seats, a member turnable in said head and provided with a tool receiving opening adapted to register with said seats, members for clamping a tool in said opening at different angles with respect to said seats, and means for applying pressure to said members between said seats.

2. A tool holder comprising a head provided with a pair of alined curved seats, a member turnable in said head and provided with a tool receiving opening adapted to register with said seats, clamping members receivable in said opening, and a stud coacting with said clamping members between said seats for clamping a tool at different angles within said opening.

3. A tool holder comprising a head having a bore and a plurality of pairs of recesses intersecting said bore, a tool post located in said bore and providing a tool receiving opening adapted to register with any one of said pairs of recesses, and means for clamping a tool in said opening and said recesses at different angles from the horizontal with respect to the axis of the bore.

4. A tool holder comprising a head having a bore and a plurality of pairs of recesses intersecting said bore, a tool post located in said bore and providing a tool receiving opening adapted to register with any one of said pairs of recesses, and tool engaging members coacting with said tool post and said recesses for clamping a tool at different angles from the horizontal within said opening.

5. A tool holder comprising a head having a bore and a plurality of pairs of opposite radial recesses intersecting the bore and each providing a curved seat, a tool post extending through said bore and providing a tool receiving opening adapted to register with any one of said pairs of said recesses, and members coacting with said tool post and with the said curved seats for clamping a tool therebetween within said opening at different angles to the axis of said bore.

6. A tool holder comprising a head having a bore and a pair of opposite radial recesses intersecting the bore and each providing a curved seat, a tool post extending through said bore and providing a tool receiving opening adapted to register with said recesses, a clamping device comprising tool engaging members adjustable on said curved seats for holding a tool at different angles within said opening, and means for applying pressure to said device at a point between said seats.

7. A tool holder comprising a head having a bore and a pair of opposite radial recesses intersecting the bore and each providing a curved seat, a tool post extending through said bore and providing a tool receiving opening adapted to register with said recesses, and a clamping device comprising members extending through said opening into said recesses for holding a tool therebetween at different angles to the axis of said bore.

8. A tool holder comprising a head having a bore and a pair of opposite radial recesses intersecting said bore and each providing a curved seat, a tool post extending through said bore and providing a tool receiving opening adapted to register with said recesses, and clamping members extending through said opening into said recesses for holding a tool therebetween, one of said members being adjustable on the seats of said recesses.

Dated this fifteenth day of December, 1921.

EMORY E. ELLIS.

Witnesses:
E. A. ROCHE,
BLANCHE TIMMINS.